United States Patent
Yoshida et al.

(10) Patent No.: US 6,288,792 B1
(45) Date of Patent: Sep. 11, 2001

(54) ELECTRONIC CAMERA

(75) Inventors: Hideaki Yoshida, Hachioji; Akio Terane, Sagamihara, both of (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/149,621

(22) Filed: Sep. 8, 1998

(30) Foreign Application Priority Data

Sep. 9, 1997 (JP) .................................................. 9-244484

(51) Int. Cl.⁷ ...................................................... G06F 15/00
(52) U.S. Cl. ......................... 358/1.15; 358/1.13; 358/1.14
(58) Field of Search ................................... 358/1.9, 1.11, 358/1.13, 1.14, 1.15

(56) References Cited

U.S. PATENT DOCUMENTS

| | | | |
|---|---|---|---|
| 5,476,010 | * 12/1995 | Fleming et al. | 73/620 |
| 5,748,326 | * 5/1998 | Thompson et al. | 358/296 |
| 5,875,034 | * 2/1999 | Shintani et al. | 358/296 |
| 5,999,203 | * 12/1999 | Cane et al. | 347/171 |
| 6,148,148 | * 11/2000 | Wain et al. | 396/2 |

FOREIGN PATENT DOCUMENTS 8281922   10/1996  (JP) .................................. B41J/2/00

* cited by examiner

*Primary Examiner*—Joseph Mancuso
*Assistant Examiner*—Douglas Q. Tran
(74) *Attorney, Agent, or Firm*—Volpe and Koenig, P.C.

(57) ABSTRACT

An electronic camera comprises a photographing/reproducing changeover switch for switching the mode of the camera between a photographing mode and a reproducing mode, a menu switch for displaying a main operation menu which includes a plurality of items, an ascending order switch for increasing a numeral assigned to each of the items of the main operation menu, a descending order switch for decreasing a numeral assigned to each of the items of the main operation menu, an execution switch for executing an instruction item included in the main operation menu, a trigger switch for inputting an instruction to perform photographing and recording, a power switch for instructing turn-on and -off of a power, a superimposition switch for designating whether or not image data should be printed with supplementary data superimposed thereon, and a reversal switch for designating whether or not an image should be printed reversed.

8 Claims, 6 Drawing Sheets

ELECTRONIC CAMERA

BACKGROUND OF THE INVENTION

This invention relates to an electronic camera, and more particularly to an electronic camera which can be connected to an external printer to output its data through the printer.

In addition to so-called silver salt cameras for recording an optical image of an object on a film using the photochemical reaction of silver halide, electronic cameras have come to be used widely, which convert an optical image of an object into an electrical signal to thereby electrically record the image, using the photoelectric conversion of a semiconductor represented by silicon. Among the electronic cameras, so-called digital cameras for recording a digital electric signal have come into mainstream use.

In the digital cameras, image information indicative of an object is recorded as a digital signal in a digital memory which is fixedly or detachably attached to the main body. The recorded image data is transferred from a data communication port provided at an appropriate portion of the camera main body to a universal personal computer (PC) via wire communication or radio communication using, for example, infrared rays.

Further, in the case of digital cameras having detachable memories, data can be also transferred by, for example, dismounting a card memory and reading data therein using a certain data reader.

The transferred image data can be displayed, edited or stored in a PC, or output by printing using a printer connected to the PC.

Since the digital cameras have a function as an image input device for inputting image data into the PC, the image data is processed usually in the form of a file as in the PC. Typically, data indicative of one still image corresponds to one file.

Moreover, in the digital cameras, there is additional data attached to image data. Typical additional data relates to the date and time at which an image indicated by image data is photographed (date/time data: this will often be referred to as "date"). The date/time data is output as data indicative of the date and time of photographing by a clock mechanism incorporated in the cameras.

In silver salt cameras at least before the invention of recent advanced photo systems, such a date and time have been recorded by a technique for superimposing on a film the date and time as an image (i.e. a character pattern). Record of the date and time using this technique became widespread after a "date-included picture" in which the date and time is superposed on a corner portion of the picture was put into practice. The selection of whether or not to superpose the date and time must be done immediately before photographing (i.e. exposing the film), and cannot be done afterwards.

On the other hand, since in the case of digital cameras, an image itself is converted into digital data, data on the date and time can be added to the image data, and the total data is dealt with as one image file. As a result, the date and time can be recorded without superimposing date/time data on image data. This means that whether or not a date/time character pattern should be superimposed on an image can be determined voluntarily at the time of display or printing, and also that the date/time data can be used for the management of images performed in a reproduction machine such as a camera itself or the PC.

In the actual camera, the additional data includes, as well as the date/time data, various photograph data—the numeral of each film frame, so-called comment data voluntarily input by the photographer, data on image quality such as the number of pixels or compressibility, exposure data on shutter speed, the aperture or the strobe, lens data on the distance to the object, zoom or macro, and data on white balance or the light source, photograph mode data on self-timer, automatic shooting or combination of pictures. These additional data items are employed if necessary.

Where the additional data is displayed or printed by the general PC, the display or printing can be optimized in accordance with software used in the PC. This is because the screen of the PC usually has a sufficient resolution and wide area, and hence it is not so difficult to simultaneously display thereon plural images or a print mode or an operation menu.

On the other hand, attention has recently been being paid to a method for directly printing an image (hereinafter referred to as "direct printing"), in which the camera is directly connected to the printer by a cable or radio without using a PC, and which satisfies the demand for digital cameras of users who do not have PCs.

Under the above-described circumstances of use, the users generally use an image display which is incorporated in the digital camera. In light of limitations such as size, cost, power, etc., the type of device used as the incorporated image display is limited, and a color LCD with a diagonal of about 2 inches or less is mainly used at the present stage.

To perform an operation for printing within the above-mentioned very much limited display performance (e.g. resolution, area, etc.), an easy-to-understand operation is required. Further, since the direct printing is assumed to be performed by general users other than the PC users as described above, the special knowledge of the operators or users has to be assumed to be very low, which means that a so-called foolproof system is highly requested.

In other words, the direct printing system employs special techniques basically different from the use of the PC, which relate to a user's operating method and/or a display manner of the state (e.g. the set mode) of the camera performed before the operation of the camera.

There is a reverse printing function as one function concerning the direct printing of the digital camera. The reverse printing function implies printing of a reversed image. The reversed image corresponds to a left-right-reversed image as a usual term, and a mirror image as a physical term.

Concerning the reverse print, various ends of use can be considered. In a case where an image is printed in a transfer film called, for example, "iron print", and then heat-transferred onto a T-shirt using e.g. a domestic iron, the image is reversed when transferred, and therefore reverse printing is employed to compensate the reverse transfer.

Furthermore, where a person is photographed by side looking photographing using a mirror in order to take a picture of them without making him aware of a subject situated to the side of them, a photographed image will be reversed and therefore reversal printing is used to compensate it.

Suppose that in the above-mentioned various cases, printing is done with supplementary data superimposed on an image. In this case, it should be noted that reversal printing is appropriate or inappropriate, depending upon whether character data is superimposed, or a character pattern is reversed or non-reversed. The following cases are inappropriate ones:

(1) When an image is printed on e.g. a T-shirt, it is disadvantageous in light of design if a character pattern such as a date pattern is superimposed on the image;

(2) When the date is to be printed, if the character pattern is superimposed on the image by non-reverse printing, a reversed character pattern will be printed on the T-shirt; and (3) Where reverse printing is used to compensate a reversed image obtained by, for example, side-looking photographing using a mirror, if the character pattern is superimposed on a resultant image, the character pattern will be reversed.

If the camera is constructed such that it can perform all kinds of printing capable of dealing with the above-described cases, it is highly possible that the above-mentioned inappropriate printing will be performed, and hence it is necessary to pay special attention so as not to avoid such inappropriate printing. This may significantly degrade the operability of the direct printing system.

It is the object of the invention to provide an electronic camera capable of performing appropriate direct printing corresponding to the purpose in a simple manner without much chance of failure, in particular, to superimpose supplementary data on an image in a reversal print mode.

BRIEF SUMMARY OF THE INVENTION

Means for Solving the Problems

An electronic camera according to the invention, which is to be connected to an external printer, generates an image file which includes object image data obtained by digitally photographing an object, and supplementary data independent of the image data, and capable of selecting one of printing of only an image corresponding to the image data, and printing of a superimposed image corresponding to superimposed image data obtained by superimposing the supplementary data on the object image data, comprising print mode selection means for selecting one of a first print mode for printing only the image of the object during execution of printing, and a second print mode for printing the superimposed image during execution of printing; and reversal print mode setting means for printing a reversed image which is a mirror image of the image of the object; wherein only the image of the object is printed during execution of printing even if the second print mode is selected by the print mode selection means, when printing of the reversed image is set by the reversal print mode setting means, with the result that appropriate direct printing corresponding to the purpose can be performed in a simple manner without much chance of failure, in particular, to superimpose supplementary data on an image in a reversal print mode.

Additional objects and advantages of the invention will be set forth in the description which follows, and in part will be obvious from the description, or may be leaned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

The embodiments of the invention will be described with reference to the accompanying drawings.

Figure 1:
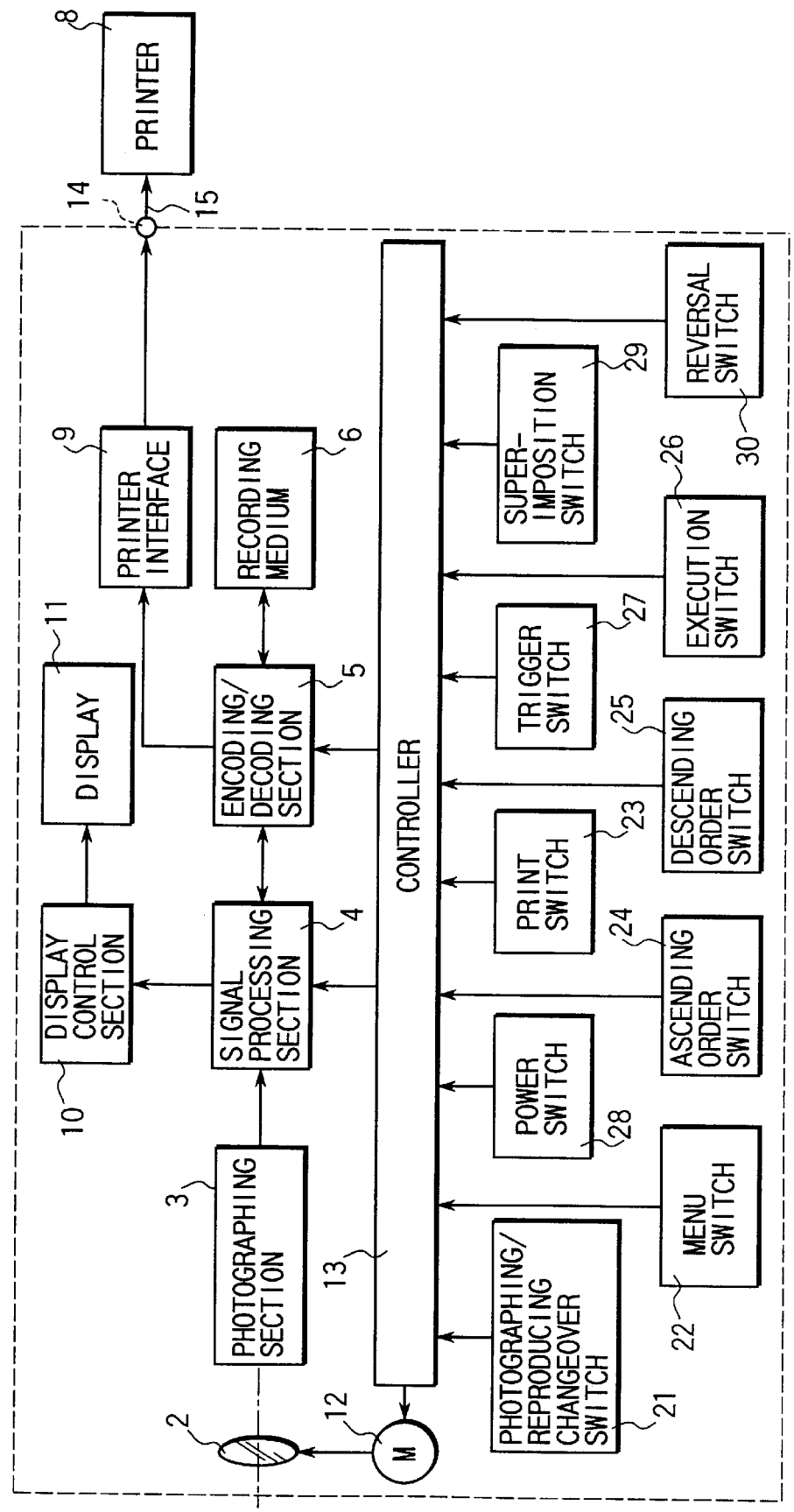
FIG. 1 is a block diagram, showing an electronic camera according to a first embodiment of the invention.

FIGS. 1–5 show a first embodiment of the invention. Specifically, FIG. 1 shows the structure of an electronic camera, FIG. 2 a front-side outward appearance of the electronic camera of FIG. 1, FIG. 3 a rear-side outward appearance of the electronic camera of FIG. 1, FIG. 4 a print mode setting menu displayed on a display shown in FIG. 1, and FIG. 5 a flowchart useful in explaining print mode setting processing performed in a control section shown in FIG. 1.

Figure 2:
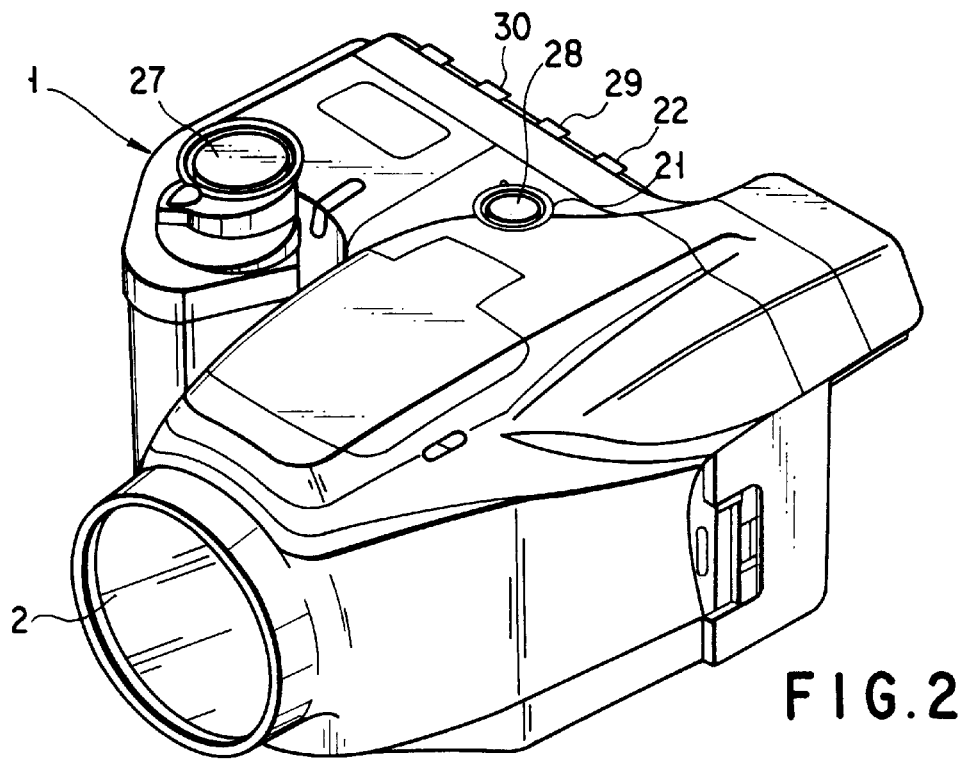
FIG. 2 is a view, showing a front-side outward appearance of the electronic camera of FIG. 1.
Figure 3:
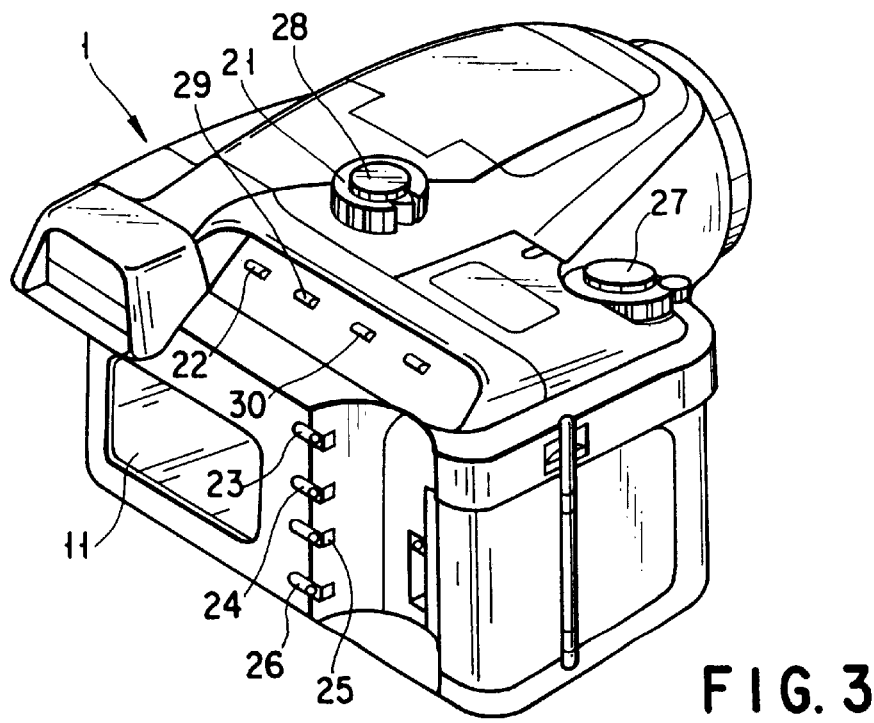
FIG. 3 is a view, showing a rear-side outward appearance of the electronic camera of FIG. 1.

As is shown in FIGS. 1–3, an electronic camera 1 according to the embodiment comprises an optical system 2, a photographing section 3, a signal processing section 4, an encoding/decoding section 5, a recording medium 6, a printer interface 9, a display control section 10, a display 11, a focusing motor 12, a controller 13 and various operation switches.

The optical system 2 is used to converge an image of a to-be-photographed object onto a photographing surface which will be described layer, and is provided on a front surface of the electronic camera 1 with a focusing lens for adjusting the focus. The photographing section 3 subjects, to photoelectric conversion, the image converged on the photographing surface by the optical system, and further converts a resultant analog signal to a digital signal. The signal processing section 4 performs various types of processing on the digital signal output from the photographing section 3. The encoding/decoding section 5 encodes the data output from the signal processing section 4 to compress it, and decodes compressed recorded data to expand it again.

The recording medium 6 stores data encoded by the encoding/decoding section 5, and consists of, for example, a flash memory installed in or detachably attached to the electronic camera 1. The printer interface 9 outputs data, encoded by the encoding/decoding section 5, to an external printer 8. The display control section 10 receives the output of the signal processing section 4 and outputs a signal for displaying an image. The section 10 has a character generator installed therein for generating, for example, a character to be used for display of a frame numeral.

The display 11 consists of, for example, an LCD to be controlled on the basis of the output of the display control section 10 and provided on a rear-side surface of the electronic camera 1 for displaying an image or a frame numeral. The focusing motor 12 drives the focusing lens of the optical system 2. The controller 13 controls the entire camera 1 which includes the above-described sections. The various switches are connected to the controller 13.

The printer interface 9 is adapted to supply image data output from the encoding/decoding section 5, to the printer 8 via a cable connector 14 and a data transfer cable 15.

The display 11 displays an image of a to-be-photographed object and serves as a finder for determining, for example, the composition of the object, when the camera 1 is in a photographing mode.

Further, the display 11 can display a main operation menu as selection setting means used to set e.g. various photographing modes, and also to reproduce a photographed image when the camera 1 is in a reproduction mode. In addition, the display 11 serves as display means for displaying, for example, a print mode setting menu when a reproduced image is printed.

In summary, the display 11 serves as display means capable of displaying a reproduced image, also displaying supplementary information such as the date and time of photographing, or information such as frame numeral, so that it overlaps with image data, and displaying a print mode setting menu at the time of printing a reproduced image.

The various operation switches include a photographing/reproducing changeover switch 21, a menu switch 22, a print switch 23, an ascending order switch 24, a descending order switch 25, an execution switch 26, a trigger switch 27, a power switch 28, a superimposition switch 29 and a reversal switch 30 as reverse printing mode selecting means. The photographing/reproducing changeover switch 21 switches the mode of the camera 1 between the photographing mode and the reproduction mode. The menu switch 22 controls the display 11 to display, for example, a main operation menu for setting e.g. the photographing mode. The print switch 23 controls the display 11 to display the print mode setting menu for setting e.g. the print mode.

The ascending order switch 24 controls an object, such as the numeral of each of frames arranged in order, so as to increase it. The descending order switch 25 controls an object, such as the numeral of frames arranged in order, so as to decrease it. The execution switch 26 executes a command item selected from the main operation menu or the print mode setting menu displayed on the display 11. The trigger switch 27 inputs an instruction to make the electronic camera 1 photograph and record an image or data. The power switch 28 instructs on/off of the electronic camera 1. The superimposition switch 29 designates whether or not supplementary data described later is superimposed on image data at the time of printing. The reversal switch 30 designates whether or not the image is reversed at the time of printing.

The photographing/reproducing changeover switch 21 is a substantially ring-shaped pivoting switch provided on a substantially center portion of the upper surface of the electronic camera 1, and the power switch 28 is provided within the substantially ring-shaped photographing/reproducing changeover switch 21. Moreover, the trigger switch 27 is a push switch situated at a location at which the user can push it by the index finger of the right hand when they grasp the electronic camera 1 by the right hand.

The print switch 23, the ascending order switch 24, the descending order switch 25 and the execution switch 26 are arranged as push switches on a right-hand portion of the display 11, while the menu switch 22 is provided as a push switch on an upper portion of the display 11.

The photographing operation of the electronic camera 1 constructed as above will be described.

First, to perform photographing, the electronic camera 1 is set at a photographing mode using the photographing/reproducing changeover switch 21. Then, power is supplied to the photographing system which includes the photographing section 3, the focusing motor 12, etc., thereby forming an image on the photographing surface of the photographing section 3 by the optical system 2, converting the image into a digital electric signal, processing of the digital signal in the signal processing section 4, and displaying an image corresponding to the processed signal on the display 11 via the display control section 10. While observing the display 11, the user determines the composition of a to-be-photographed object.

The output of the signal processing section 4 is also input to the controller 13, where it is determined whether or not the focal position is appropriate. If it is determined that the focal position is inappropriate, the focusing motor 12 is controlled to drive the focusing lens of the optical system 2 so as to obtain an appropriate focal position.

After a good focal position and composition are obtained and then the user pushes the trigger switch 27 to record images, the output of the signal processing section 4 is encoded by the encoding/decoding section 5, whereby the images are recorded in the recording medium 6 on the basis of a predetermined format, for example, in units of one file for each image. Each image file includes image data, and supplementary data which includes a frame numeral assigned to the image data.

To perform image reproduction, the electronic camera 1 is set at the reproduction mode using the photographing/reproducing changeover switch 21. Then, images are reproduced in the order beginning from an image of, for example, a designated frame numeral. Thus, first, image data corresponding to the designated frame numeral is read from the recording medium 6.

If, for example, an image with the first frame numeral is reproduced, image data with the first frame numeral is read, decoded by the encoding/decoding section 5, and displayed on the display 11 via the signal processing section 4 and the display control section 10. At this time, the display control section 10 generates a character corresponding to the frame numeral using a character generator incorporated therein, and causes the image data to be displayed with the character superimposed thereon.

When the user tries to reproduce the next image of the second frame numeral, they operate the ascending order switch 24, thereby causing the controller 13 to start control to reproduce the image with the second frame numeral. Specifically, image data of the second frame numeral is read from the recording medium 6, and the encoding/decoding section 5 starts decoding of the image data. When decoding by the encoding/decoding section 5 has been finished, the image with the second frame numeral is displayed on the display 11 via the signal processing section 4 and the display control section 10. Thereafter, images with the second and third frame numerals will be displayed in the same manner as above.

Figure 4:
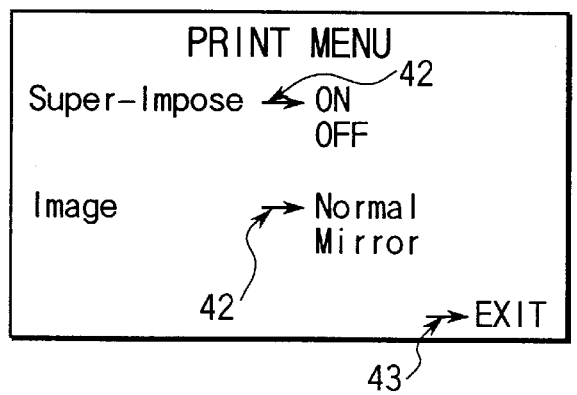
FIG. 4 is a view, illustrating a print mode setting menu displayed on a display shown in FIG. 1.

Printing of images will now be described. First, the print switch 23 is pushed to display the print mode setting menu on the display 11. Then, the following processing 1 or 2 is performed in accordance with the display of the display 11 as shown in FIG. 4:

Processing 1:

Selection is performed between a print mode in which supplementary data is superimposed on image data (Super-Impose ON) and a print mode in which no supplementary data is superimposed on image data (Super-Impose OFF).

Processing 2:

Selection is performed between a print mode in which an image reproduced in the reproduction mode is printed as it is (Normal Image Printing) and a print mode in which an image is printed with its right and left reversed (Mirror Image Printing).

As a result of the above selection for print mode setting, corresponding image data is read from the recording medium 6, decoded by the encoding/decoding section 5, and output to and printed from the printer 8 via the printer interface 9, the cable connector 14 and the data transfer cable 15.

More specifically, the display 11 is made to display data as shown, for example, in FIG. 4, thereby moving an arrow 41 by the superimposition switch 29 so as to set printing with supplementary data superimposed (Super-Impose ON), or printing without such superimposition (Super-Impose OFF). Subsequently, an arrow 42 is moved by the reversal switch 30 so as to set standard printing (Normal Image Printing) or reversal printing (Mirror Image Printing). When such setting has been performed, an arrow 43 appears in an EXIT position. If at this time, the execution switch is pushed, the above setting is decided.

In the print mode setting menu, various kinds of print modes can be set. For example, the range of printing, simultaneous printing of plural images, etc. can be set in stages.

Figure 5:
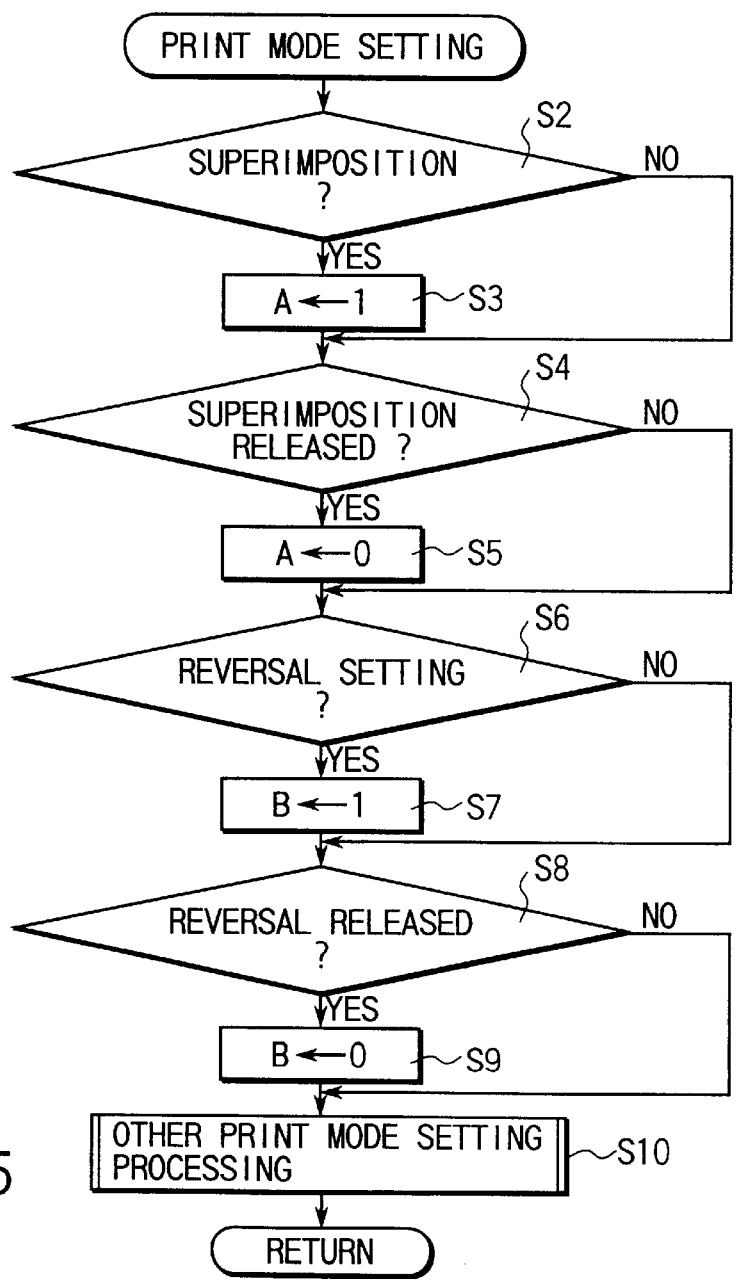
FIG. 5 is a flowchart, useful in explaining processing for print mode setting in a control section shown in FIG. 1.

After the above setting is done, print mode setting processing is performed in the controller 13 as illustrated at a step S2 et seq. in FIG. 5. Flags A and B, which are used during the processing to respectively indicate whether or not supplementary data is superimposed and whether the printing is the normal or reversed one, are initialized to A=0 and B=0 at a step S1 (not shown) which is included in the initializing processing of the camera. After values are set in the print mode setting performed in accordance with FIG. 5, the set values are maintained until they are changed in a later loop of the print mode setting or the initializing processing is performed.

At the step S2 of FIG. 5, it is determined whether or not the Super-Impose ON mode, in which supplementary data is superimposed, is set in the print mode setting menu shown in FIG. 4. If the mode is set, the flag A is set at 1 at a step S3 and the program proceeds to a step S4. If, on the other hand, it is determined at the step S2 that the Super-Impose ON mode is not set, the program directly proceeds to the step S4.

At the step S4, it is determined whether or not the Super-Impose OFF mode, in which superimposition of supplementary data is released, is set in the print mode setting menu, on contrary to the step S2. If the Super-Impose OFF mode is set, the flag B is set at 1 at a step S5 and the program proceeds to a step S6. If, on the other hand, it is determined at the step S2 that the Super-Impose OFF mode is not set, the program directly proceeds to the step S6.

Since in the print mode setting menu, one of the superimposition mode and the superimposition released mode is selected, the flag A is set at "1" or "0" as a result of processing of steps S1–S5.

In the step S6, it is determined whether or not the Mirror Image Printing, in which reversal printing is performed, is set in the print mode setting menu of FIG. 4. If it is determined that the reversal printing (Super-Impose ON) is set, the flag B is set at "1" at a step S7 and the program proceeds to a step S8. If, on the other hand, it is determined at the step S6 that the reversal printing (Super-Impose ON) is not set, the program directly proceeds to the step S8.

At the step S8, it is determined whether or not the Normal Image Printing mode, in which reversal printing is released, is set in the print mode setting menu, on contrary to the step S6. If it is determined that the Normal Image Printing mode is set, the flag A is set at "0" at a step S9 and the program proceeds to a step S10. If it is determined at the step S2 that the Normal Image Printing mode is not set, the program directly proceeds to the step S10.

Since in the print mode setting menu, one of the Mirror Image Printing mode and the Mirror Image Printing released mode is selected, the flag B is set at "1" or "0" as a result of processing of steps S6–S9.

At the step S10, various kinds of print modes set in other print mode setting menus are set, thereby terminating the print mode setting processing.

On the basis of the thus-set values of the flags A and B, the controller 13 performs control for execution of printing, and supplies data to the printer interface 9.

Specifically:

(1) If the flags A and B is both "0", a normal image, which has no supplementary data superimposed thereon and which is not reversed, is printed.

(2) If the flags A and B are "1" and "0", respectively, a normal image, which has supplementary data superimposed thereon and which is not reversed, is printed.

(3) If the flags A and B are "0" and "1", respectively, a mirror image with no supplementary data superimposed thereon is printed.

(4) If the flags A and B are both "1", a mirror image with no supplementary data superimposed thereon is printed.

During printing, information indicative of whether supplementary data is superimposed, and whether the image is reversed is displayed on the display 11. From this, the user can easily confirm the print modes they have set.

As described above, even when in the embodiment, superimposition of supplementary data and reversal of an image are simultaneously set, a reversed image with no supplementary data superimposed is printed. Accordingly, when, for example, an image is heat-transferred to a T-shirt using a home iron, supplementary data such as a character is not superimposed on the transferred reverse image, which means that heat transfer of an image with reversed supplementary data can be easily and reliably prevented.

Although in the embodiment, a mirror image with no supplementary data superimposed thereon is printed if the flags A and B are both "1", the invention is not limited to this. It may be modified, for example, such that if the flags A and B are both "1", a mirror image with supplementary data superimposed thereon is printed. This enables realization, by heat transfer, of an image with desired non-reversed supplementary data, as well as simple and reliable prevention of an image with reversed supplementary data, when, for example, an image is heat-transferred to a T-shirt using a home iron.

Moreover, it may be modified such that if the flags A and B are both "1", a mirror image with reversed supplementary data superimposed thereon is printed. This enables simple and reliable printing of a normal image with non-reversed supplementary data, when, for example, a mirror image is printed to compensate e.g. side-looking photographing using a mirror. This is because an image obtained by side-looking photographing and having reversed supplementary data superimposed thereon is reversed.

Figure 6:
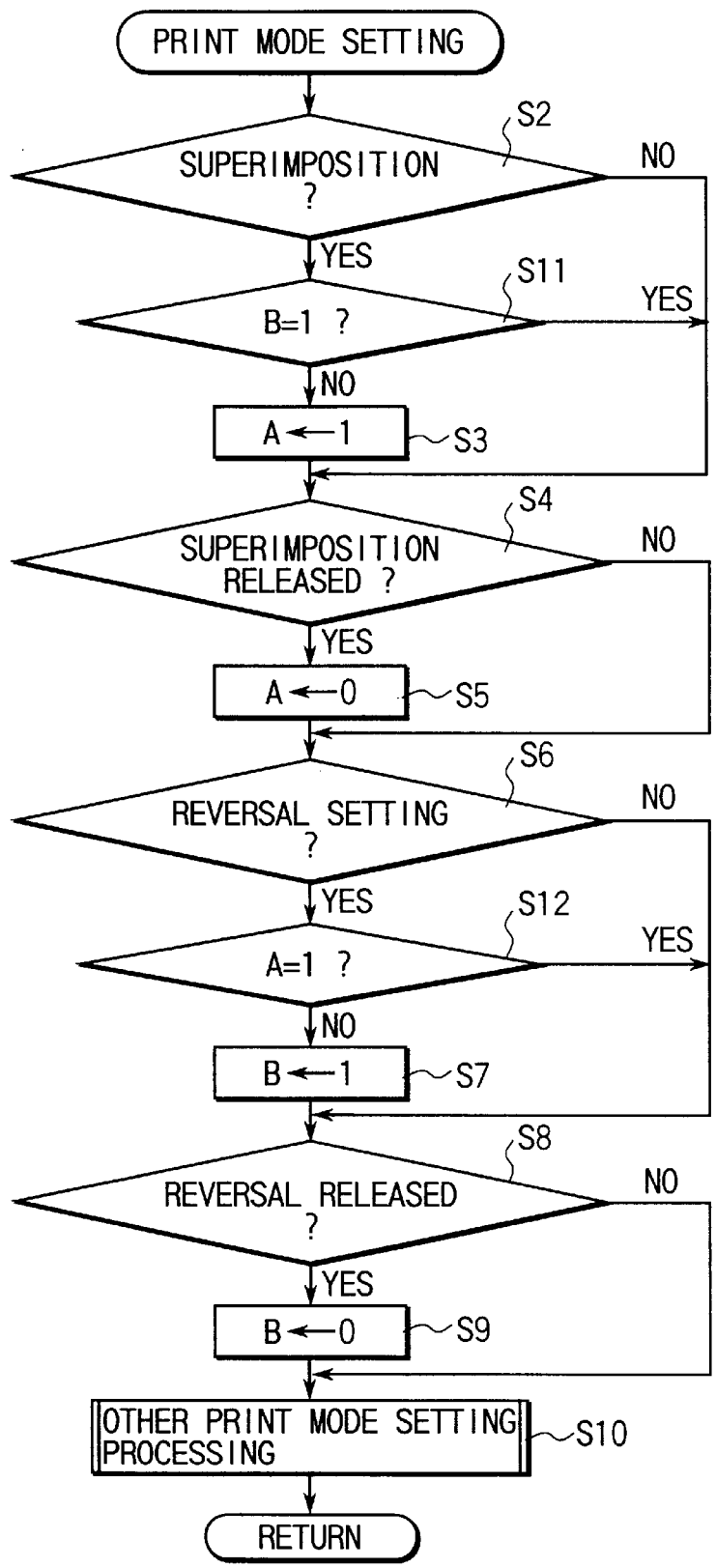
FIG. 6 is a flowchart, useful in explaining processing for print mode setting in a control section incorporated in a second embodiment of the invention.

FIG. 6 is a flowchart, useful in explaining print mode setting processing performed in a controller according to a second embodiment of the invention. Since the second embodiment differs from the first embodiment only in print mode setting processing, only the print mode setting processing will be described and description of the other processing will be omitted.

As is shown in FIG. 6, print mode setting processing performed in a controller 13 according to the second embodiment is constructed such that a step S11 is inserted between the steps S2 and S3 of the print mode setting processing performed in the first embodiment, and a step S12 between the steps S6 and S7 of the same.

Specifically, if it is determined in the step S2 that supplementary data is superimposed (Super-Impose ON), it is determined in the step S11 whether or not the flag B is "1". If the flag B is "1", the processing at the step S3 is not performed and the program directly proceeds to the step S4. If the flag B is not "1", the processing at the step S3 is performed. Similarly, if it is determined at the step S6 that the Mirror Image Printing mode is set, it is determined whether or not the flag A is "1" in the step S12. If the flag A is "1", the processing at the step S7 is not performed and the program directly proceeds to the step S8. If the flag A is not "1", the processing at the step S7 is performed.

As a result, only the following three kinds of printing can be performed in the print mode:

(1) If the flags A and B is both "0", a normal image, which has no supplementary data superimposed thereon and which is not reversed, is printed.

(2) If the flags A and B are "1" and "0", respectively, a normal image, which has supplementary data superimposed thereon and which is not reversed, is printed.

(3) If the flags A and B are "0" and "1", respectively, a mirror image with no supplementary data superimposed thereon is printed.

The other print mode setting processing is similar to that in the first embodiment.

As described above, in this embodiment, whether or not the processing at the steps S3 and S7 should be executed is determined from the value of the flag B in the Super-Impose ON mode at the step S11, and the value of the flag A in the Mirror Image Printing mode at the step S12. If the flag B is "1" in the Super-Impose ON mode, setting the flag A at "1" is prohibited, while if the flag A is "1" in the Mirror Image Printing mode, setting the flag B at "1" is prohibited. As a result, where, for example, an image is heat-transferred onto a T-shirt using a home iron as in the first embodiment, a reversed image to be transferred has no supplementary data such as a character superimposed thereon, which means that heat transfer of an image with reversed supplementary data can simply and reliably be prevented.

Figure 7:
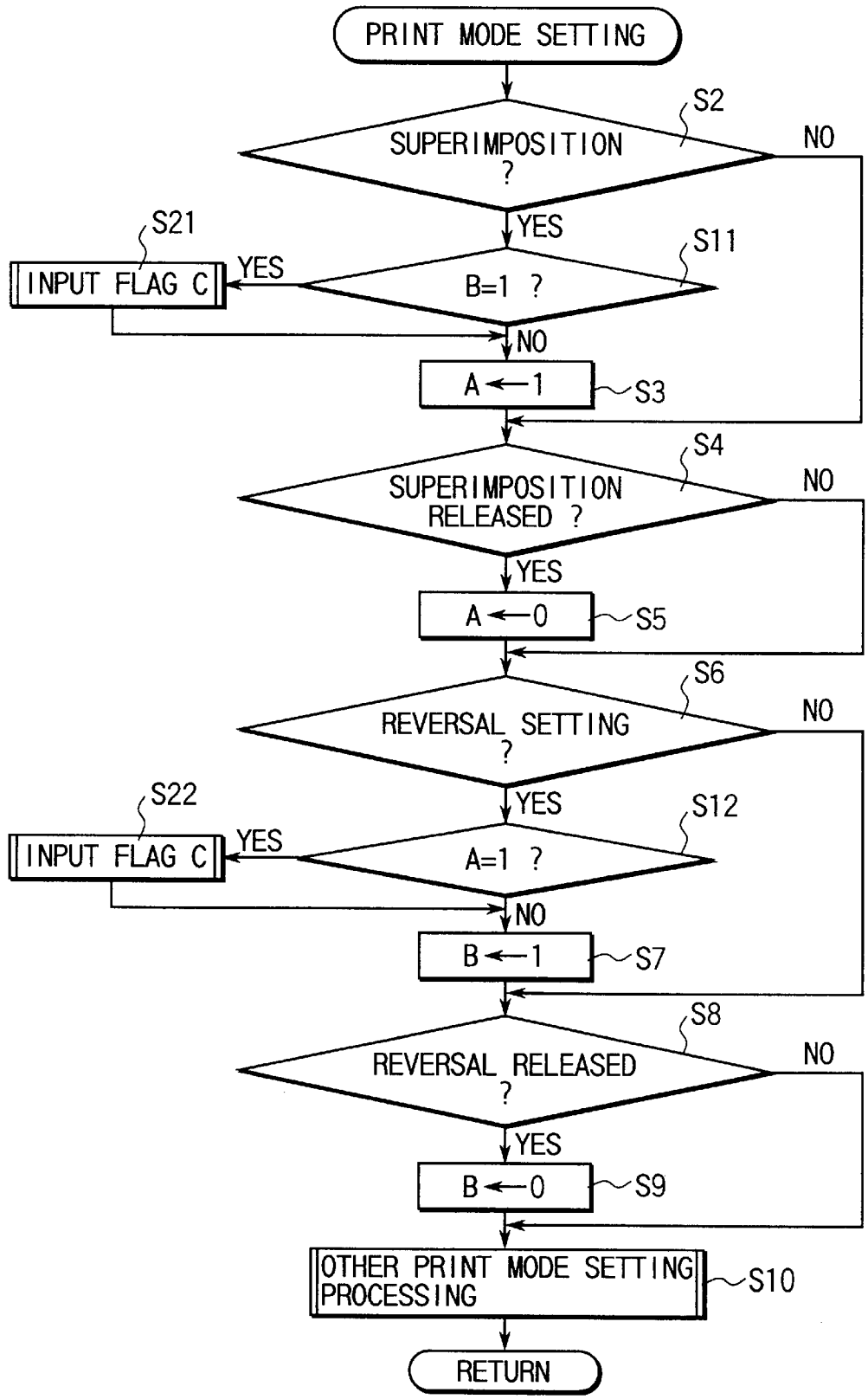
FIG. 7 is a flowchart, useful in explaining processing for print mode setting in a control section incorporated in a third embodiment of the invention.

FIG. 7 is a flowchart, useful in explaining print mode setting processing performed in a controller according to a third embodiment of the invention. Since the third embodiment differs from the second embodiment only in print mode setting processing, only the print mode setting processing will be described and description of the other processing will be omitted.

In the print mode setting processing of the second embodiment, determination is performed at the step S11. Specifically, if it is determined at the step S11 that the flag B is "1", the program proceeds to the step S4, while if it is determined at the step S12 that the flag A is "1", the program proceeds to the step S8.

However, in the print mode setting processing performed in the controller 13 of the third embodiment, determination is performed at the step S11 as shown in FIG. 7. Specifically, it is determined at the step S11 that the flag B is "1", the program proceeds to a step S21. At the step S21, input of a flag C for designating whether or not supplementary data should be superimposed reversed is waited. After the flag C is input, the program proceeds to the step S4. Similarly, it is determined at the step S11 that the flag B is "1", the program proceeds to a step S22. At the step S22, input of the flag C for designating whether or not supplementary data should be superimposed reversed is waited. After the flag C is input, the program proceeds to the step S8.

The flag C is input using a print mode setting menu, an ascending order switch 24, a descending order switch 25 and an execution switch 26, which are not shown. If the flag C is "0", supplementary data is superimposed non reversed, whereas if the flag C is "1", the supplementary data is superimposed reversed.

As a result:

(1) If the flags A and B is both "0", a normal image, which has no supplementary data superimposed thereon and which is not reversed, is printed.

(2) If the flags A and B are "1" and "0", respectively, a normal image, which has supplementary data superimposed thereon and which is not reversed, is printed.

(3) If the flags A and B are "0" and "1", respectively, a mirror image with no supplementary data superimposed thereon is printed.

(4) Where the flags A and B are both "1", a mirror image with non-reversed supplementary data superimposed thereon is printed if the flag C is "0", and a mirror image with reversed supplementary data superimposed thereon is printed if the flag C is "1".

As described above, where in this embodiment, the flags A and B are both "1", the flag C is input to thereby designate whether or not supplementary data to be superimposed is reversed. Thus, an image with supplementary data of a desired state (reversed or non-reversed) superimposed thereon can be printed easily and reliably.

Figures 8, 9:
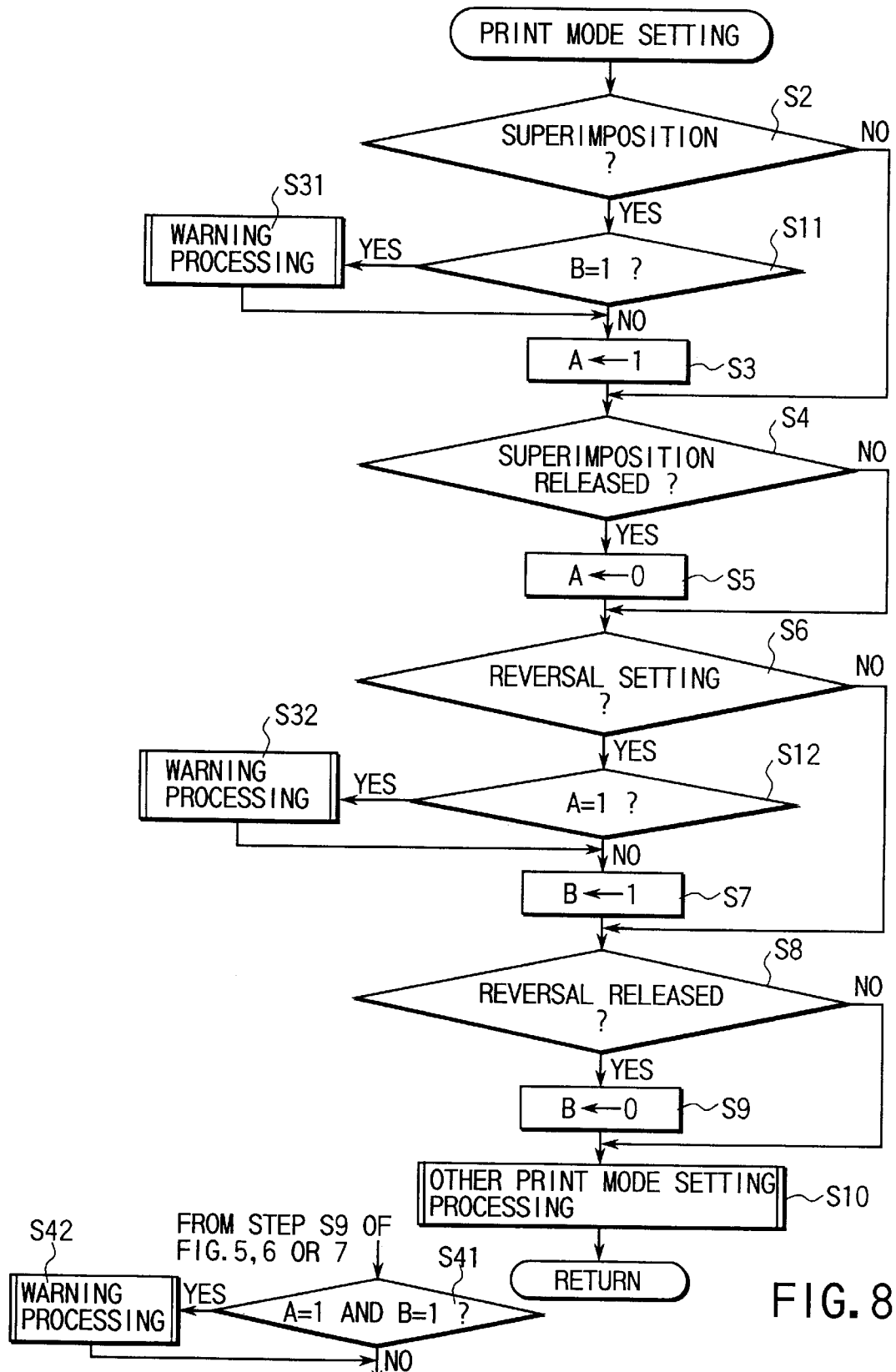
FIG. 8 is a flowchart, useful in explaining processing for print mode setting in a control section incorporated in a fourth embodiment of the invention.
FIG. 9 is a partial flowchart, useful in explaining a case where warning processing shown in FIG. 8 is applied to each of the first and third embodiments.

FIGS. 8 and 9 are directed to a fourth embodiment of the invention. FIG. 8 is a flowchart, useful in explaining print mode setting processing performed in a controller. FIG. 9 shows an essential part of a flowchart obtained by applying warning processing in FIG. 8 to the first or third embodiment.

If it is determined at the step S11 in the print mode setting processing of the second embodiment that the flag B is "1", the program proceeds to the step S4, while if it is determined at the step S12 that the flag A is "1", the program proceeds to the step S8.

However, in the print mode setting processing performed in the controller 13 of the third embodiment, determination is performed at the step S11 as shown in FIG. 8. Specifically, it is determined at the step S11 that the flag B is "1", the program proceeds to a step S31, where warning processing is performed. The program then proceeds to the step S4. Similarly, it is determined at the step S11 that the flag B is "1", the program proceeds to a step S32, where warning processing is performed. The program then proceeds to the step S8.

The warning processing is performed by causing a buzzer (not shown) provided in the electronic camera 1 to generate a warning sound, or by displaying a warning signal on the display 11.

Thus, this embodiment can inform the user of prohibition of simultaneous setting of the Super-Impose ON mode and the Mirror Image Printing mode. As a result, the user can recognize that they are trying to simultaneously set the Super-Impose ON mode and the Mirror Image Printing mode, and hence can know the possibility of a printing result differing from the expected one, and be free from the misunderstanding that an error has occurred. In summary, in any of the first through third embodiments, simultaneous setting of superimposition and reversal of data should be particularly noted. Where the fourth embodiment is employed, the user can perform setting in good consideration of the possibility of the simultaneous setting.

In any of the first through third embodiments, a similar advantage can be obtained by inserting, between the steps S9 and S10, a step S41 for determining whether the flags A and B are both "1", and a step S42 for performing warning processing when the flags A and B are both "1", as is shown in FIG. 9.

Although in the above embodiments, the camera 1 is connected to the printer 8 by the data transfer cable 15, the invention is also applicable to a case where they are connected to each other by a radio communication represented by infrared rays.

As described above, when in the electronic camera of the invention, printing of a reversed image is set by reversal printing mode setting means, only an image is printed during printing even if print mode selection means selects a second print mode. Therefore, in particular, superimposition of supplementary data on an image to be printed in a reversal print mode can be performed in a simple manner without much occurrence of failure. Thus, appropriate direct printing corresponding to any purpose can be carried out.

In the above description, the term "direct printing (system)" indicates a state in which the camera is directly connected to the printer. However, "special techniques differing from the use of the PC" stated in the section "BACKGROUND OF THE INVENTION", from which the object and advantage of the invention derive, does not relate to the type of connection, but to the type of control. Therefore, even if a PC, a telephone line, the Internet or other is interposed between the camera and the printer, the technique of the invention can effectively function as in the case of the "direct printing (system)", when printing by the printer is based on instructions from the camera.

Accordingly, although only the term "direct printing" is used in some portions of the description, the technique and the scope of right of the invention include any other system which has a similar feature to the above-mentioned case wherein an element is interposed between the camera and the printer.

Additional advantages and modifications will readily occur to those skilled in the art. Therefore, the invention in its broader aspects is not limited to the specific details and representative embodiments shown in described herein. Accordingly, various modifications may be made without departing from the spirit or scope of the general inventive concept as defined by the appended claims and their equivalents.

What is claimed is:

1. An electronic camera to be connected to an external printer, comprising:

means for generating an image file which includes object image data obtained by digitally photographing an object, and supplementary data independent of the image data;

means for causing the external printer to selectively execute printing of only an image of the object corresponding to the object image data, and printing of a superimposed image corresponding to superimposed image data obtained by superimposing the supplementary data on the object image data;

print mode selection means for selecting one of a first print mode for printing only the image of the object during execution of printing, and a second print mode for printing the superimposed image during execution of printing;

reversal print mode setting means for printing a reversed image which is a mirror image of the image of the object; and means for printing only the image of the object during execution of printing even if the second print mode is selected by the print mode selection means, when printing of the reversed image is set by the reversal print mode setting means.

2. An electronic camera to be connected to an external printer, comprising:

means for generating an image file which includes object image data obtained by digitally photographing an object, and supplementary data independent of the image data;

means for causing the external printer to selectively execute printing of only an image of the object corresponding to the object image data, and printing of a superimposed image corresponding to superimposed image data obtained by superimposing the supplementary data on the object image data;

print mode selection means for selecting one of a first print mode for printing only the image of the object during execution of printing, and a second print mode for printing the superimposed image during execution of printing;

reversal print mode setting means for printing a reversed image which is a mirror image of the image of the object; and means for prohibiting selection of the second print mode by the print mode selection means when printing of the reversed image is set by the reversal print mode setting means.

3. An electronic camera to be connected to an external printer, comprising:

means for generating an image file which includes object image data obtained by digitally photographing an object, and supplementary data independent of the image data;

means for causing the external printer to selectively execute printing of only an image of the object corresponding to the object image data, and printing of a superimposed image corresponding to superimposed image data obtained by superimposing the supplementary data on the object image data;

print mode selection means for selecting one of a first print mode for printing only the image of the object during execution of printing, and a second print mode for printing the superimposed image during execution of printing;

reversal print mode setting means for printing a reversed image which is a mirror image of the image of the object; and means for superimposing the supplementary data on the object image data such that a character included in the supplementary data is printed non-reversed, when printing of the reversed image is set by the reversal print mode setting means, and at the same time when the second print mode is selected by the print mode selection means.

4. An electronic camera to be connected to an external printer, comprising:

means for generating an image file which includes object image data obtained by digitally photographing an object, and supplementary data independent of the image data;

means for causing the external printer to selectively execute printing of only an image of the object corresponding to the object image data, and printing of a superimposed image corresponding to superimposed image data obtained by superimposing the supplementary data on the object image data;

print mode selection means for selecting one of a first print mode for printing only the image of the object during execution of printing, and a second print mode for printing the superimposed image during execution of printing;

reversal print mode setting means for printing a reversed image which is a mirror image of the image of the object; and means for superimposing the supplementary data on the object image data such that a character included in the supplementary data is printed reversed, when printing of the reversed image is set by the reversal print mode setting means, and at the same time when the second print mode is selected by the print mode selection means.

5. An electronic camera to be connected to an external printer, comprising:

means for generating an image file which includes object image data obtained by digitally photographing an object, and supplementary data independent of the image data;

means for causing the external printer to selectively execute printing of only an image of the object corresponding to the object image data, and printing of a superimposed image corresponding to superimposed image data obtained by superimposing the supplementary data on the object image data;

print mode selection means for selecting one of a first print mode for printing only the image of the object during execution of printing, and a second print mode for printing the superimposed image during execution of printing;

reversal print mode setting means for printing a reversed image which is a mirror image of the image of the object; and means for selecting one of processing for superimposing the supplementary data on the object image data such that a character included in the supplementary data is printed non-reversed, and processing for superimposing the supplementary data on the object image data such that a character included in the supplementary data is printed reversed, when printing of the reversed image is set by the reversal print mode setting means, and at the same time when the second print mode is selected by the print mode selection means.

6. An electronic camera to be connected to an external printer, comprising:

means for generating an image file which includes object image data obtained by digitally photographing an object, and supplementary data independent of the image data;

means for causing the external printer to selectively execute printing of only an image of the object corresponding to the object image data, and printing of a superimposed image corresponding to superimposed image data obtained by superimposing the supplementary data on the object image data;

print mode selection means for selecting one of a first print mode for printing only the image of the object during execution of printing, and a second print mode for printing the superimposed image during execution of printing;

reversal print mode setting means for printing a reversed image which is a mirror image of the image of the object; and means for generating a warning when the printing of the reversed image is set by the reversal print mode setting means, and at the same time when the second print mode is selected by the print mode selection means.

7. An electronic camera comprising:

a photographing/reproducing changeover switch for switching the mode of the camera between a photographing mode and a reproducing mode;

a menu switch for displaying a main operation menu which includes a plurality of items;

an ascending order switch for increasing a numeral assigned to each of the items of the main operation menu;

a descending order switch for decreasing a numeral assigned to each of the items of the main operation menu;

an execution switch for executing an instruction item included in the main operation menu;

a trigger switch for inputting an instruction to perform photographing and recording;

a power switch for instructing turn-on and -off of a power;

a superimposition switch for designating whether or not image data should be printed with supplementary data superimposed thereon; and a reversal switch for designating whether or not a reversed image should be printed.

8. An electronic camera according to any one of claims 1–7, wherein the supplementary data is time/date data which indicates at least one of date and time.

* * * * *